United States Patent Office 3,371,940
Patented Mar. 5, 1968

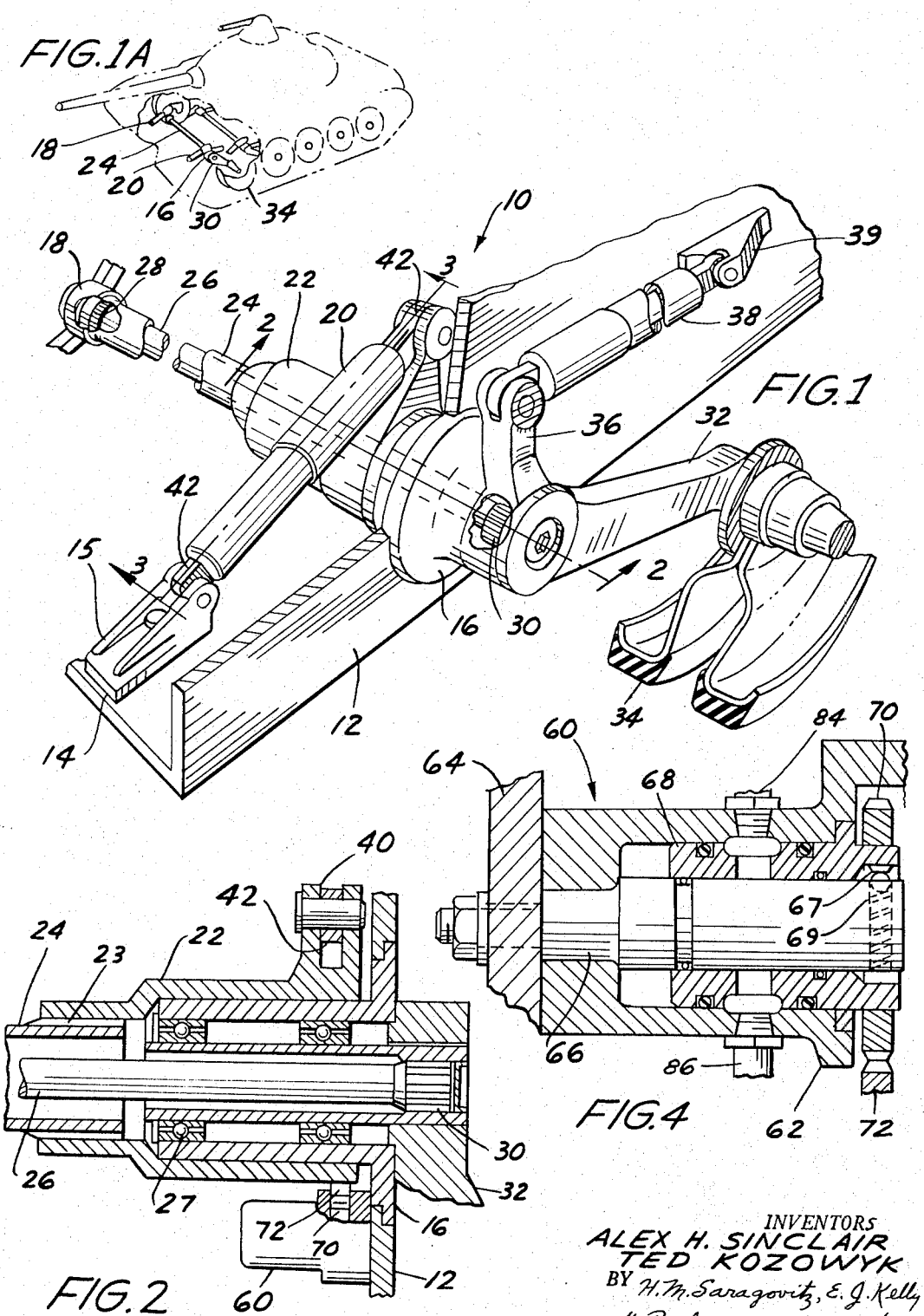

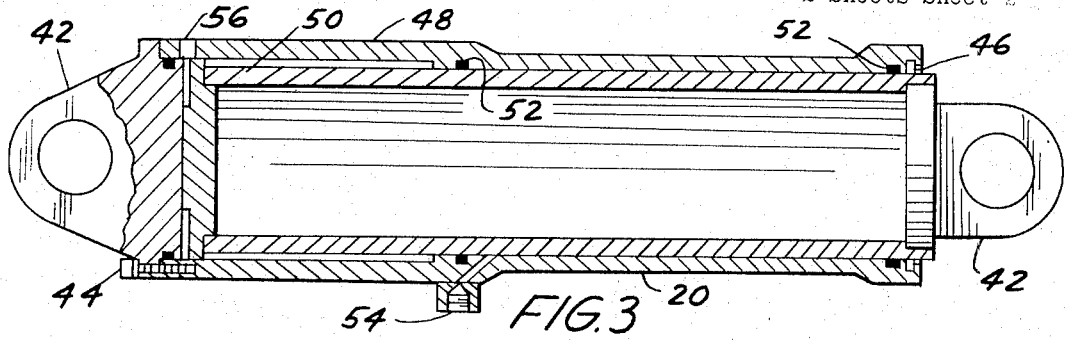
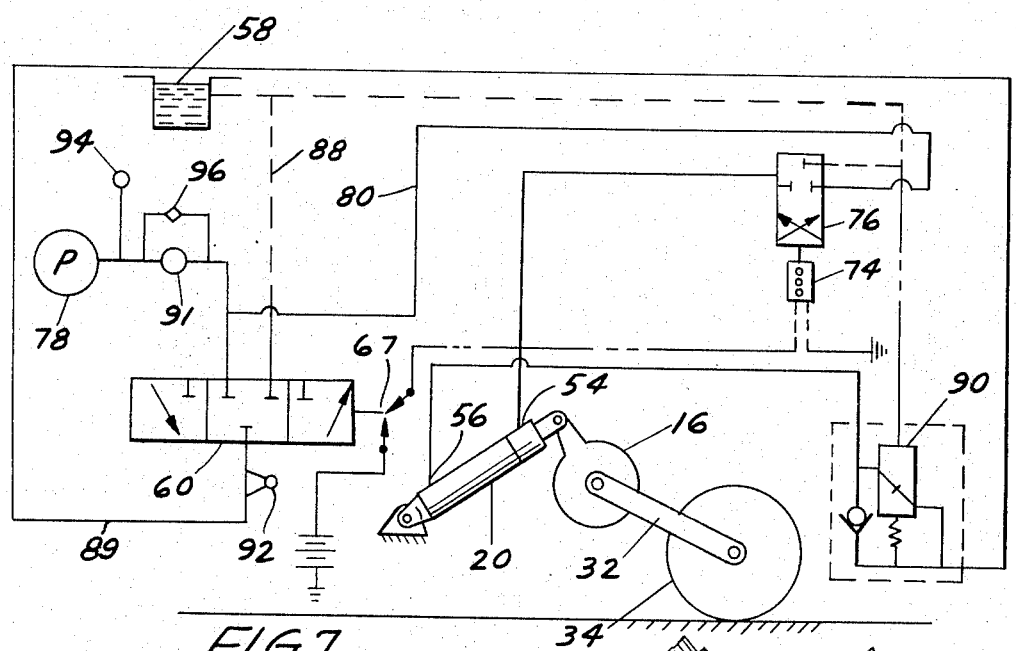
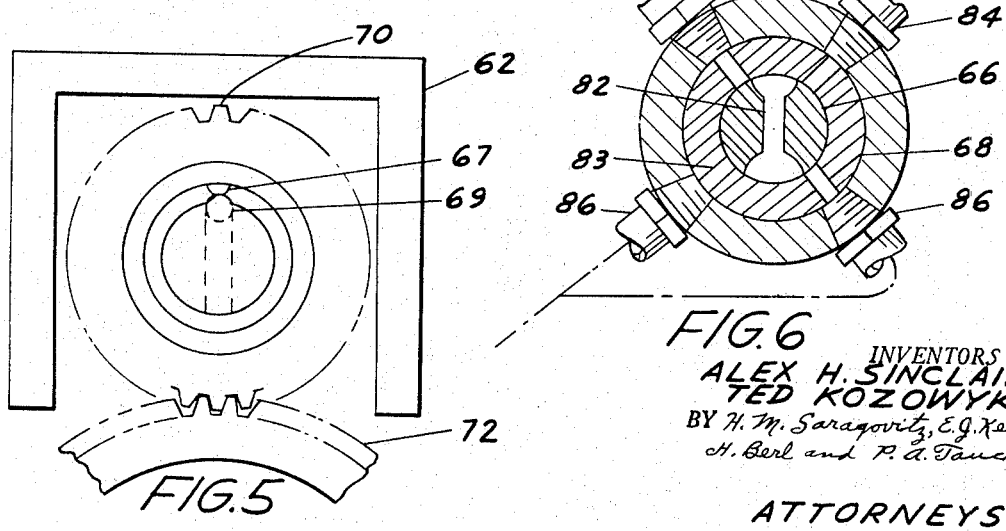

3,371,940
VEHICLE VARIABLE HEIGHT
SUSPENSION SYSTEMS
Alex H. Sinclair, Southfield, and Ted Kozowyk, Detroit, Mich., assignors to the United States of America as represented by the Secretary of the Army
Filed June 15, 1966, Ser. No. 559,045
4 Claims. (Cl. 280—43.23)

ABSTRACT OF THE DISCLOSURE

An apparatus for actuating and controlling the variable ground clearance of tracked or wheeled vehicles, comprising an hydraulically actuated road arm.

---

The invention described herein may be manufactured and used by or for the Government of the United States of America for governmental purposes without payment of any royalties thereon or therefor.

The present invention relates to vehicle suspension systems, and more particularly to tracked vehicle suspension systems having variable height capabilities.

Prior art pertinent to the problem solved, generally and broadly relates to vehicle suspensions, but not to vehicle suspensions having variable height adjustment capabilities. As an example, U.S. Patent 3,117,800 and U.S. Patent 3,157,394 disclose vehicle suspension systems, but they do not teach variable height adjustments of a vehicle by means of the suspension system. The prior art cited, teaches instead the use of bump stops, lockout, and suspensions per se.

In the instant invention, the problems of vehicle suspension, and variable height adjustment, not previously apparent or disclosed, have been solved, thereby greatly increasing the usefulness of tracked vehicles in all types of terrain and condition.

An object of the present invention is to obtain a significant increase in cross-country mobility of vehicles.

Another object is to provide low vehicle spring rates to reduce hull pitch and bounce accelerations.

A further object of the invention is to achieve variable ground clearance to enable vehicle to maintain higher average speeds than presently obtained when traversing mud and large obstacles normally encountered in cross-country operations.

Still another object is to obtain high wheel travel to reduce vehicle pitching when traversing rough terrain.

Other objects and advantages of the invention will hereinafter become more fully apparent from the following description of the annexed drawings, in which like reference numerals designate like parts throughout the figures thereof and which illustrate a preferred embodiment, and wherein:

FIG. 1 is a perspective view, having sectioned areas, of a single variable suspension unit of the invention.

FIG. 1A illustrates a schematic perspective view of the mounting, relation, and use of several suspension units shown in FIG. 1 to make up a complete variable suspension system.

FIG. 2 is a sectioned view thru a suspension unit, with the unit rotated 90 degrees clockwise showing the flow and position control valve.

FIG. 3 is a sectioned view of the hydraulic cylinder of FIG. 1, showing specifies of the interference lock.

FIGURES 4–6 depict representative views of the flow and position control valve on each of the suspension units representatively shown in FIG. 1A to effect control of said units.

FIG. 7 is a schematic diagram of the systems hydraulic control.

Referring now to the drawings in detail, wherein, like reference characters designate like or corresponding parts throughout the several views, there is shown in FIG. 1 a single suspension unit 10, mounted on the interior of vehicle 12, by supports 14, 16, and 18. Support member 14 is an interior mounted screw down type anchor member having a clevis yoke 15 for support of adjustable cylinder 20, whereas member 16 is bell shaped and member 18 is a threaded plug type support with both supports being mounted on the exterior of the vehicle. It is to be understood that the supports may be of types and shapes other than that shown and described, so long as the members perform the function of support.

Rotatable about support member 16 is a bell crank member 22 having directly connected thereto, torsion tube 24 and cylinder 20. Torsion tube 24 may be keyed or splined to member 22 as shown at 23, and as shown in FIG. 1A is disposed within and through the vehicle and is held in position on the opposite side by support 18.

Within torsion tube 24 is a torsion bar 26 which provides the springing and adjustment means for the vehicle. Torsion bar 26 is splined to the torsion tube and support member 18 as at 28 and in turn is splined at 30 to the road arm 32 and road wheels 34. Bearings 27 are conventional, wherein bearing means are provided between the rotating members.

Roadarm 32 has connected thereto by means of a U-shaped arm 36, a hydraulic shock absorber 38 located on the exterior of the vehicle and attached to the vehicle by anchor means 39. Hydraulic shock absorber 38 is of conventional design, and during normal vehicle operation absorbs shock transmitted from the road wheels to the road arm which are too minute to be perceived by the torsion bar suspension. Shock absorbers of this type and as used in this capacity, are conventional and well known in the art.

Cylinder 20, shown in FIG. 3, is connected to support member 14 and bell crank member 22 by a U-shaped member 40 formed integral with bell crank 22. Bell crank 22 as previously described, is keyed to torsion tube 24, whereupon cylinder 20 being activated, which will be more fully described, torsion tube 24 is rotated wherein road arm 32 and road wheels 34 are raised or lowered. At each end of the cylinder is an eye 42, for ease of connection as shown in FIG. 1. Bolts 44 and clips 46 retain cylinder assembly 48 to piston 50, and O rings, or gaskets 52 provide the sealing means for the assembly. Cylinder 48 and piston 50 are held in a selected position by frictional engagement between the members.

To change the height of the vehicle, motion is transmitted by piston 50 to bell crank 22, through the torsion bar 24 and torsion tube 26 to the road wheel arm and wheels. Fluid is supplied at port 54 to release the friction lock, and at 56 to provide forward motion to the piston. A barrel 48 forms interference fit with the outside diameter of tubular shaft 50, thereby providing a zero clearance mechanical connection to lock the tubular shaft 50 in any position. When pressurized hydraulic fluid through port 54 is introduced into the lock cavity formed between members 48 and 50, the barrel 48 expands radially relieving the interference and providing ample clearance so that the tubular shaft 50 is free to move axially with minimum resistance. The lock is re-engaged by removing pressure from port 54. Upon reaching a desired vehicle height the fluid required to release the friction lock flows back through port 54 to a fluid reservoir 58 wherein members 48, 50 are in contact to provide the friction lock. It is obvious that fluid pressure is maintained through port 56 on the pressure side of piston 50 whenever the vehicle is in a position other than at the lowest position.

FIGURES 4–6 depict the flow and position control valve 60 used at each of the specific elevating elements of the suspension system wherein the valve comprise a housing 62, control lever 64 attached to a fluid control spool 66, with spool 66 having a switch 67 adjacent one end thereof opposite lever 64. Located between housing 62 and spool 66, is a control valve sleeve 68 having control gear 70 attached thereto. Gear 70 is driven by gear 72 on bell crank 22. Switch 67, a normally open switch, is activated by rotation of spool 66 and deactivated by detent 69 integral with spool 66.

In operation, the vehicle driver, in order to raise the vehicle, rotates lever 64 in a clockwise direction, to a position required. The height and length position indicator can be a visual mechanical lever pointer mechanism providing a ready indication of degrees or inches of movement of the vehicle hull or the indicator may be any known means for providing a height reference. The maximum travel of suspension units would also be a ready indicator as to maximum and minimum height. Rotation of lever 64 rotates spool 66 which is keyed to the lever, wherein switch 67 is energized thereby activating the solenoid 74 on lock valve 76 opening the lock valve. Fluid pressure from pump 78 flows through line 80 to port 54 on cylinder 48 releasing the interference lock on the cylinder thereby allowing piston 50 to move freely.

As spool 66 is rotated, the hour glass orifice 82 in the spool is likewise rotated to a position in line with port 84, and one of ports 86 whereby fluid flows through the ports, through pressure line 89, through the counter balance valve 90 to piston 50 wherein axial motion of the piston is translated to rotary motion through bell crank 22 to rotate the torsion tube, bar, and roadarms.

As the vehicle is being raised, gear 72 which is directly attached to member 22 is rotated, thereby rotating gear 70 and control sleeve 68. Upon reaching desired vehicle height, switch 67 on control sleeve 68 contacts detent 69 on spool 66 thereby deenergizing the switch and solenoid 74 wherein fluid flows back to reservoir 58 locking the interference lock on cylinder 48, holding the vehicle at the desired height. Ports 83 in sleeve 68 are now out of alignment with ports 84, 86 and orifice 82 as shown in FIG. 6 blocking fluid flow through the valve.

To lower the vehicle, lever 64 is moved in the counterclockwise direction, switch 67 is energized, the interference lock is released as above, fluid flows through the counter balance valve 90 to the reservoir 58, thereby allowing the piston 50 to retract from its raised position wherein the vehicle is lowered. Upon reaching the desired position, the interference lock is engaged as described above, wherein the vehicle is held in the set position.

Members 91, 92, 94, and 96 are by-pass and relief valves, well known in hydraulic control circuit art and are incorporated in the circuit to provide the necessary protection to the circuit.

Obviously many modifications and variations of the present invention are possible in the light of the above teachings. It is therefore to be understood, that within the scope of the appended claims, the invention may be practiced otherwise than as specifically described.

Having thus described the invention, what is claimed is:

1. A variable height suspension system comprising a vehicle, spring means on said vehicle, support means on said vehicle connected to said spring means, wheels on said spring means, motion translating means connected to said support means and said spring means, power means and valve means to control motion of said motion translating means whereby upon said valve means being positioned to a desired vehicle ground clearance, power is supplied to said motion translating means through said valve means rotating said spring means to provide the desired ground clearance, said spring means comprising a torsion bar within a torsion tube disposed laterally and interiorly of said vehicle, and a shock absorber disposed on the exterior of said vehicle, the same being connected to said torsion bar by means of an arm on said vehicle wheels.

2. A variable suspension system comprising a vehicle, spring means on said vehicle, support means on said vehicle connected to said spring means, wheels on said spring means, motion translating means connected to said support means and spring means, power means and valve means to control motion of said translating means whereby upon said valve means being positioned to a desired vehicle ground clearance, power is supplied to said motion translating means through said valve means rotating said spring means to attain the desired ground clearance, said motion translating means comprising a crank connected to said spring means, means having an integral lock therein and being connected to said crank, wherein said power means supplies power thereto, opening said lock and extending said means and rotating said crank and spring means to effect the ground clearance of said vehicle, said spring means comprising a torsion bar within a torsion tube disposed laterally and interiorly of said vehicle, and a shock absorber disposed on the exterior of said vehicle, the same being connected to said torsion bar by means of an arm on said vehicle wheels.

3. A variable height fluid pressure suspension system comprising a vehicle, spring means on said vehicle, support means on said vehicle connected to said spring means, wheels on said spring means, motion translating means connected to said support means and spring means, power means and valve means to control motion of said motion translating means whereby upon said valve means being positioned to a desired vehicle ground clearance, power is supplied to said motion translating means through said valve means rotating said spring means wherein the vehicle is raised or lowered to the desired ground clearance, wherein the valve means comprises, a housing, a sleeve means within said housing having ports therein, a control lever being attached to a spool member having a port therein located within said housing and being disposed within said sleeve and in contact therewith, first gear means on said valve opposite said control lever, second gear means on said motion translating means, and contact means adjacent said first gears and activated by said gears whereby upon fluid pressure being supplied to said valve means in response to movement of said control lever, ports in said sleeve and said spool are aligned, opening said contact wherein fluid pressure is ported to said motion translating means rotating said spring means effecting the vehicle ground clearance, whereupon said vehicle reaching the desired setting, said first gears which are rotated by said second gears, close said contact stopping fluid flow locking the vehicle at the desired height.

4. A vehicle height suspension system comprising a vehicle, spring means on said vehicle, supporting means on said vehicle connected to said spring means, wheels on said spring means, motion translating means connected to said support means and spring means, power means and valve means to control motion of said motion translating means whereby upon said valve means being positioned to a desired vehicle ground clearance, power is supplied to said motion translating means through said valve means rotating said spring means, wherein the vehicle is raised or lowered to the desired ground clearance wherein said motion translating means comprises a crank connected to said spring means, and means having an integral lock therein and being connected to said crank, wherein said power means supplies power thereto, opening said lock and extending said means and rotating said crank and spring means effecting the ground clearance of said vehicle, wherein said valve means comprises, a housing, a sleeve means within said housing having ports therein, a control lever being attached to a spool member having a port therein located within said housing and being disposed within said sleeve and in contact therewith, first gear means on said valve opposite said control lever, second gear means on said motion translating means, and contact means adjacent said first gears and activated by said gears whereby upon fluid pressure being supplied to said valve means in response to movement of said control lever, ports in said sleeve and said spool are aligned, opening said contact wherein fluid pressure is ported to said motion translating means rotating said spring means effecting the vehicle ground clearance, whereupon said vehicle reaching the desired setting, said first gears which are rotated by said second gears close said contact stopping fluid flow locking the vehicle at the desired height.

References Cited

UNITED STATES PATENTS

| | | | |
|---|---|---|---|
| 3,047,283 | 7/1962 | Kivell | 267—57 X |
| 3,117,800 | 1/1964 | Magnuson | 280—124 |
| 3,246,405 | 4/1966 | Reynolds | 180—9.52 X |
| 3,254,738 | 6/1966 | Larsen | 180—41 X |
| 3,262,522 | 7/1966 | Johnson | 180—9.2 X |
| 3,299,978 | 1/1967 | Sponsler | 180—41 X |

FOREIGN PATENTS 1,118,622  11/1961  Germany.

RICHARD J. JOHNSON, *Primary Examiner.*